Sept. 24, 1935.  M. S. TYSON  2,015,206
ANTIFRICTION BEARING UNIT
Filed Oct. 17, 1934
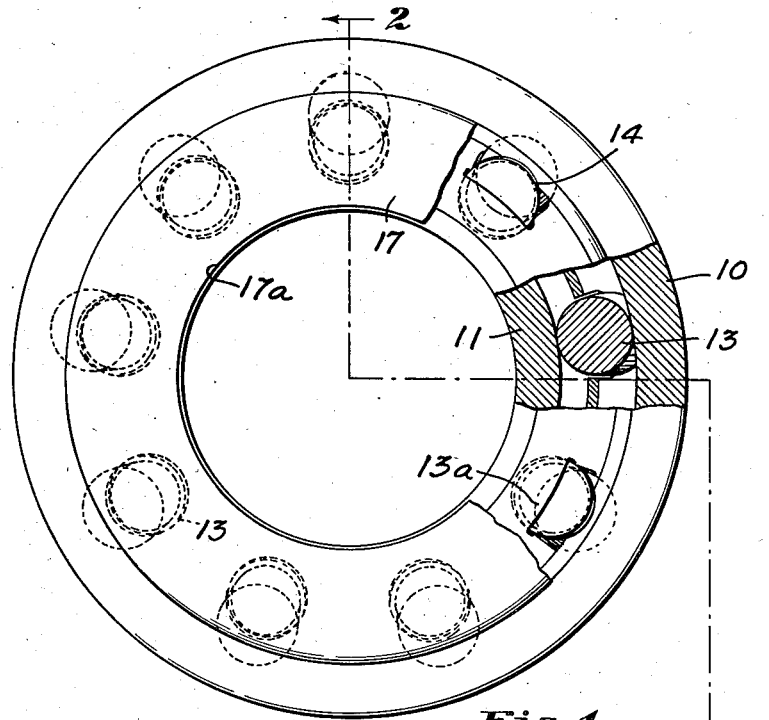
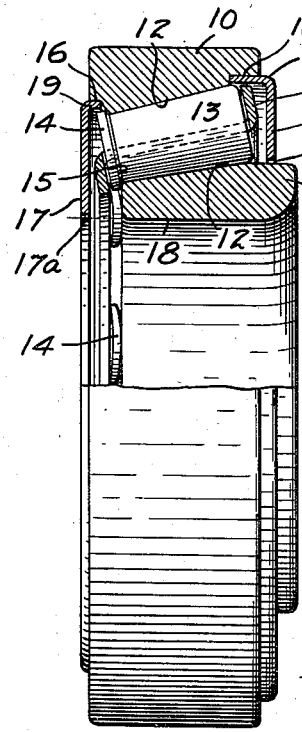
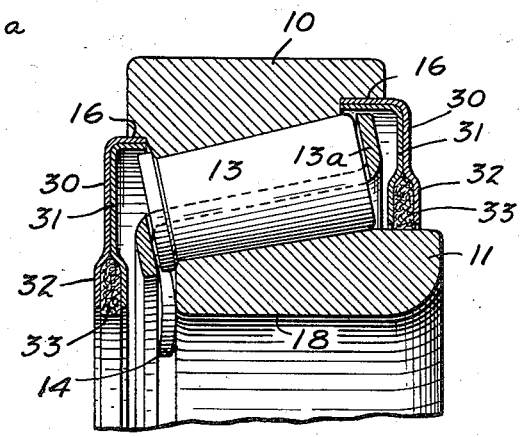
INVENTOR
Milton S. Tyson
BY
Evans & McCoy
HIS ATTORNEYS Patented Sept. 24, 1935

2,015,206

UNITED STATES PATENT OFFICE 2,015,206

ANTIFRICTION BEARING UNIT

Miller S. Tyson, Canton, Ohio, assignor to Marcus T. Lothrop, Canton, Ohio; Margaret F. Lothrop executrix of said Marcus T. Lothrop, deceased Application October 17, 1934, Serial No. 748,568

2 Claims. (Cl. 308—187)

This invention relates to bearings of the antifriction type, and more particularly to means for retaining grease therein.

One of the objects of the present invention is to provide an anti-friction bearing unit of such character that it may be packed with grease before installation on a given device and that the grease will be retained therein during its use.

Another object is to provide an anti-friction bearing unit in which the outer race thereof is provided with annular grease sealing members at its ends and which are so arranged with respect to the relatively rotatable part that a quantity of grease may be retained within the bearing unit sufficient to care for the bearing during its operation under normal operating conditions.

A further object is to provide an anti-friction bearing unit with grease sealing members which are so arranged as to permit inspection of the anti-friction members without disassembly of the complete unit.

With the above and other objects in view, the present invention consists in certain features of construction and combinations of parts to be hereinafter described with reference to the accompanying drawing, and then claimed.

In the drawing, which illustrates suitable embodiments of the invention,

Figure 1 is an end elevation of the anti-friction bearing unit selected for the purpose of illustration;

Fig. 2 is an elevation partially in section, the section being taken approximately on the line 2—2 of Fig. 1;

Fig. 3 is an enlarged fragmentary section similar to the bearing unit illustrated in Fig. 2, but showing a modified sealing means.

Illustrative of the usefulness and practicability of the bearing unit of the present invention, it is common practice in order to lubricate the bearings used in the front wheels of motor vehicles, to maintain a quantity of grease in the hub caps and to allow this grease to work its way along the wheel spindle to the anti-friction bearing units. Inasmuch as the inner end of the wheel hub is provided with a single seal only, the grease, particularly in warm weather and when the conventional seal is well soaked with grease, frequently works its way into the brake drum and onto the braking surfaces where it reduces braking action and results in the application of unequal braking pressure to the four wheels of the vehicle. Frequently the brake lining or facing has to be renewed because of leakage of grease from the front wheel spindles, and this, of course, is a source of annoyance to the vehicle owner.

In the bearing construction of the present invention, I have provided a sealing means which will enable each bearing to be packed with grease before installation, and which especially in the case of front wheel bearings for motor vehicles will not only eliminate the necessity of carrying surplus grease in the hub caps but also will prevent the leakage of grease from the bearing units.

For the purpose of illustration, I have shown an anti-friction bearing of the tapered roller type.

Referring to the accompanying drawing, in which like numerals refer to like parts throughout the several views, the bearing unit comprises an outer cup or race 10, and an inner cone or race 11 each having tapered bearing faces 12 between which the series of rollers 13 are arranged to operate. Each roller 13 is tapered and provided with a head 14 at its end of smaller diameter which has a conical surface 15 for thrust engagement with the inner edge of the race 11 substantially in the line of rolling contact of the roller with the bearing face 12 of the inner race. It is to be understood, however, that the roller construction does not form a part of the present invention as the invention is also applicable to other anti-friction bearings, such as those of the ball or straight roller type. In the present illustration, however, the bearing unit is provided with a suitable retaining member 13a for the rollers 13 which is arranged within the pitch line of the rollers to provide for the retention of the rollers on the outer race when the inner race is removed.

In the construction shown in Figs. 1 and 2 the outer race 10 is provided at each end with a counterbore which forms a circular circumferential recess 16 in the radial end face. The left end of the bearing unit, as viewed in Fig. 2, is provided with an annular sealing member 17 preferably of sheet metal, the radial portion of which extends approximately into alignment with the inner circumferential face 18 of the inner race 11 so that when the unit is mounted on the shaft or trunnion or other part the sealing member 17 will have a slight operating clearance, indicated at 17a, with such part. The outer circumferential edge of the sealing member 17 is preferably formed with a circumferential flange 19 arranged to be engaged with the axial wall of the recess 16 with a sufficient press fit to hold the sealing member 17 in position. The flange 19, however, may be omitted if desired.

The right end of the bearing unit, as viewed in Fig. 2, is also provided with an annular sealing member 20 also preferably of sheet metal and having a circumferential flange 21 engaging the wall of the recess 16 at that end with a sufficient press fit to hold the sealing member 20 in position. The radial portion of this sealing member, since the inner race 11 projects axially beyond the radial face of the outer race 10, extends approximately to the circumferential face of the inner race 11, sufficient clearance, as indicated at 20a, being provided so as not to interfere with the free relative rotation of the races 10 and 11. If the outer race 10 should extend axially beyond the inner race as at the opposite end of the bearing unit, then, of course, the sealing member 20 should extend approximately to and have a slight clearance with the shaft trunnion or other part on which the inner race 11 is mounted.

In some instances it may be desired to exclude dirt and other foreign material from the bearing unit as well as retain grease therein, and in Fig. 3 I have shown a modification of sealing members which are suitable for this purpose.

The two sealing members which are carried in the circumferential recesses 16 formed in the radial end faces of the outer race 10, are each formed of an outer part 30 and an inner part 31 nested within the outer part, the outer part 30 being directly carried by means of a press fit in the recess 16. The radially inner portions of the parts 30 and 31 are axially spaced to provide offset flanges 32 between which an annular sealing ring 33 of felt, cork or other non-metallic sealing material, is disposed, the sealing ring preferably having running engagement with the circumferential face of the inner race 11 or part on which the inner race is mounted, as the case may be. These sealing members may be formed, however, of any other suitable or practical material for retaining and supporting sealing rings 33.

During the assembly of the bearing unit, one of the annular sealing members is assembled and the unit is preferably packed with grease before the other sealing member is pressed into position.

By reason of the grease sealing members described, sufficient grease can be retained within the bearing unit to properly lubricate the same during its life under all normal operating conditions and repacking of the bearing unit or the provision of a reserve supply of grease, such as is the present practice in motor vehicle front wheels, should be unnecessary. The sealing members will effectively prevent the leakage of grease to other parts of the machine or apparatus, using the bearing units where it might, were it not for the sealing members described be detrimental to such parts.

It will be noted that the grease sealing members are of rather simple construction and will not materially add to the cost of anti-friction bearing units and will in the case of the use of the bearing units in motor vehicle front wheels eliminate the cost of providing for a reserve supply of lubricant.

One of the advantages of the constructions described is that the inner race may be removed without injury to the sealing members and without disassembly of the cup assembly, thereby providing easy access to the rollers for inspection.

Although two embodiments of the invention have been herein shown and described, it will be understood that numerous details of the construction shown may be altered or omitted without departing from the spirit of this invention as defined in the following claims.

What I claim is:

1. A taper roller bearing comprising concentric cone and cup elements having conical roller engaging surfaces, a plurality of tapered rollers disposed between said surfaces, a roller retainer disposed within the pitch line of the rollers to hold the rollers within the cup element prior to the assembly of the cone element thereto, a grease sealing plate carried by said cup element at the end, of smaller internal diameter, and a second annular grease sealing plate carried at the opposite end of said cup element and having its inner peripheral edge surrounding said cone element in relatively closely spaced relation whereby to permit withdrawal of said cone element to permit inspection of said rollers without disassembly of said cup element, rollers, retainer and sealing plates.

2. A taper roller bearing comprising a cup assembly and a cone element, said cup assembly comprising a cup having a conical roller engaging surface, a plurality of spaced tapered rollers engageable with said surface, a roller retainer for holding said rollers within said cup prior to assembly of said cone element thereto and grease sealing plates at the opposite ends of said cup, the ends of said cup being recessed to receive said plates with a tight fit, the plate at the cup end of greatest internal diameter having its inner circumferential edge surrounding said cone element in relatively closely spaced relation whereby to permit withdrawal of said cone element without disassembly of said cup assembly so as to permit inspection of said rollers.

MILLER S. TYSON.